United States Patent [19]

Hilker et al.

[11] Patent Number: 5,247,471
[45] Date of Patent: Sep. 21, 1993

[54] RADIX ALIGNER FOR FLOATING POINT ADDITION AND SUBTRACTION

[75] Inventors: Scott A. Hilker; Glen H. Handlogten, both of Rochester, Minn.

[73] Assignee: International Business Machines Corporation, Armonk, N.Y.

[21] Appl. No.: 807,002

[22] Filed: Dec. 13, 1991

[51] Int. Cl.$^5$ ............................................... G06F 7/50
[52] U.S. Cl. .................................................. 364/748
[58] Field of Search .................................... 364/748

[56] References Cited

U.S. PATENT DOCUMENTS

| | | | |
|---|---|---|---|
| 4,639,887 | 1/1987 | Farmwald | 364/748 |
| 4,811,272 | 3/1989 | Wolrich et al. | 364/788 |
| 4,852,039 | 7/1989 | Maheshwari et al. | 364/748 |
| 4,858,165 | 8/1989 | Gronowski et al. | 364/748 |
| 5,016,209 | 5/1991 | Ikeda et al. | 364/748 |
| 5,021,986 | 6/1991 | Nakamura | 364/748 |
| 5,111,421 | 5/1992 | Molnar et al. | 364/748 |
| 5,146,419 | 9/1992 | Miyoshi et al. | 364/748 |

Primary Examiner—David H. Malzahn
Attorney, Agent, or Firm—Roy W. Truelson

[57] ABSTRACT

In a hardware floating point adder, each operand exponent is logically divided into fields. The corresponding fields of each exponent are input to a separate shift logic circuit which determines a relative amount to shift the operand mantissa without reference to any carry bit from a lower order field. Both mantissas are potentially shifted, each by one or more shift logic circuit outputs, making it possible to perform some of the shifts simultaneously. Using 11 bit exponents in accordance with ANSI/IEEE Standard 754-1985, double format for 64-bit numbers, operand registers are logically divided into: field #3, consisting the lowest two order bits; field #2 consisting of the next lowest two order bits after the first two; and field #1 consisting of the highest 7 order bits. The shift logic circuit for field #3 shifts and Operand A mantissa, right or left, 0, 1, 2 or 3 bits. The shift logic circuit for field #2 simultaneously shifts an Operand B mantissa, right or left, 0, 4, 8 or 12 bits. The shift logic circuits for field #1 shifts and Operand B mantissa, right or left, 0, 16, 32, 48 or 64 bits; this shift is performed after the shift from field #2. The cumulative shifts performed above effect a relative shift of the two mantissas by the correct amount. The mantissas are then added/subtracted in the normal manner, and shift adjusted after the addition/subtraction.

11 Claims, 13 Drawing Sheets

| BITS 10-11<br>A   B | A SHIFT |
|---|---|
| 00  00 | 0 |
| 00  01 | R1 |
| 00  10 | R2 |
| 00  11 | R3 |
| 01  00 | L1 |
| 01  01 | 0 |
| 01  10 | R1 |
| 01  11 | R2 |
| 10  00 | L2 |
| 10  01 | L1 |
| 10  10 | 0 |
| 10  11 | R1 |
| 11  00 | L3 |
| 11  01 | L2 |
| 11  10 | L1 |
| 11  11 | 0 |

501

| BITS 8-9<br>A   B | B SHIFT |
|---|---|
| 00  00 | 0 |
| 00  01 | L4 |
| 00  10 | L8 |
| 00  11 | L12 |
| 01  00 | R4 |
| 01  01 | 0 |
| 01  10 | L4 |
| 01  11 | L8 |
| 10  00 | R8 |
| 10  01 | R4 |
| 10  10 | 0 |
| 10  11 | L4 |
| 11  00 | R12 |
| 11  01 | R8 |
| 11  10 | R4 |
| 11  11 | 0 |

502

503

| BITS 6-7<br>A   B | INTERMED SHIFT SIGNAL | FINAL B SHIFT AMOUNT | | |
|---|---|---|---|---|
| | | A(1:5) = B(1:5) | A(1:5) = B(1:5)+1 | A(1:5) = B(1:5)-1 |
| 00  00 | 0 | 0 | R64 | L64 |
| 00  01 | L16 | L16 | R48 | X |
| 00  10 | L32 | L32 | R32 | X |
| 00  11 | L48 | L48 | R16 | X |
| 01  00 | R16 | R16 | X | L48 |
| 01  01 | 0 | 0 | R64 | L64 |
| 01  10 | L16 | L16 | R48 | X |
| 01  11 | L32 | L32 | R32 | X |
| 10  00 | R32 | R32 | X | L32 |
| 10  01 | R16 | R16 | X | L48 |
| 10  10 | 0 | 0 | R64 | L64 |
| 10  11 | L16 | L16 | R48 | X |
| 11  00 | R48 | R48 | X | L16 |
| 11  01 | R32 | R32 | X | L32 |
| 11  10 | R16 | R16 | X | L48 |
| 11  11 | 0 | 0 | R64 | L64 |

X = Don't care

RADIX ALIGNER FOR FLOATING POINT ADDITION AND SUBTRACTION

FIELD OF THE INVENTION

The present invention relates to digital data computation and in particular to performing addition and subtraction operations on digital data represented in floating point format.

BACKGROUND OF THE INVENTION

A modern computer system typically comprises a central processing unit (CPU), and other supporting hardware such as system memory, communications busses, input/output controllers, storage devices, etc. The CPU is the heart of the system. It executes the instructions which comprise a computer program and directs the operation of the other system components. The speed as which the CPU executes its instructions ultimately determines the speed at which the computer system performs assigned tasks.

In a computer, numeric data may be represented in a variety of formats, but these may generally be classed as either fixed point (also called binary or integer) or floating point. A fixed point representation is a single series of digits, in which a decimal point, binary point, or other radix point has some assumed fixed position. Commonly, this fixed position is to the immediate right of the lowest order digit, making the number represented an integer. A floating point representation contains two parts: a mantissa and an exponent. The number being represented is the product of the mantissa and a base (usually either 2 or 16) raised to the power of the exponent.

Because a floating point representation allows the radix point to shift ("float") according to the value of the exponent, it is possible to represent a much larger range of numbers with an equivalent amount of storage using a floating point representation than a fixed point representation. Additionally, a floating point representation maintains the same degree of precision for very small numbers that it does for very large numbers. These characteristics make floating point representation desirable for many applications, particularly engineering and scientific applications requiring intensive numeric computation.

One of the major drawbacks with floating point representation as opposed to fixed point is that the amount of time required by the CPU to perform floating point arithmetic is significantly greater than the time required for fixed point arithmetic. This is particularly true for floating point addition and subtraction operations. Typically, in order to add/subtract two floating point numbers, the CPU will (a) subtract the exponents to determine the difference in exponents, (b) shift to the right the mantissa of the number having the smaller exponent by the exponent difference, (c) add/subtract the mantissas, (d) shift the resultant mantissa and adjust the exponent, if necessary, and (e) round at the lowest order bit of the resultant mantissa. These steps are performed sequentially, and typically will constitute the critical path for CPU execution, meaning that the rest of the CPU will be idle waiting for the addition/subtraction to complete. Since the performance of the system is intimately tied to the speed at which the CPU can execute its instructions, the time required to complete the above sequence becomes a bottleneck to system performance. This bottleneck is more serious for numeric-intensive applications.

SUMMARY OF THE INVENTION

It is therefore an object of the present invention to provide an enhanced method and apparatus for performing floating point arithmetic in a computer system.

Another object of this invention is to increase the performance of a computer system which performs floating point arithmetic.

Another object of this invention is to increase the speed at which a processor executes a floating point addition/subtraction operation.

A central processing unit (CPU) of a computer system comprises means for adding and subtracting floating point numbers. The exponent of each operand is stored in an operand exponent register, which is logically divided into a plurality of fields, each field comprising a plurality of contiguous bits of the exponent. The corresponding fields of each exponent are input to a combinatorial logic circuit (shift logic) which determines a relative shift amount. The shift logic circuit determines the amount of the shift without reference to any carry bit from a lower order field, making it possible to input all fields to their respective shift logic circuits simultaneously, and to receive output from the logic circuits without waiting for a carry to propagate through each one. The output of the shift logic circuits is used to shift operand mantissas. Both mantissas are potentially shifted, each by one or more shift logic circuit outputs, making it possible to perform some of the shifts simultaneously.

In the preferred embodiment, the floating point operands are represented in accordance with ANSI/IEEE Standard 754-1985, double format for 64-bit numbers. In this format, the exponent contains 11 bits. The operand registers are logically divided into four fields, field #3 consisting the two lowest order bits, field #2 consisting of the next two lowest order bits after the first two, field #1B consisting of the next two lowest order bits after the first 4, and field #1A consisting of the 5 highest order bits. The shift logic circuit for field #3 shifts one of the operand mantissas (Operand A), right or left, 0, 1, 2 or 3 bits. The shift logic circuit for field #2 simultaneously shifts the other operand mantissa (Operand B), right or left, 0, 4, 8 or 12 bits. The shift logic circuits for field #1 combine a full decode circuit for field #1B (similar to the logic used for decode of fields 2 and 3) with a limited decode in the form of a direct compare circuit for field #1A to shift the Operand B mantissa, right or left, 0, 16, 32, 48 or 64 bits; this shift is performed after the shift from field #2. Because the mantissa is only 53 bits wide, it is not necessary to shift for the additional higher order bits of field #1. If a direct compare of these bits shows that they are not identical, there is no need to add/subtract mantissas because the operand with the larger exponent will dominate the result. The cumulative shifts performed above effect a relative shift of the two mantissas by the correct amount. The mantissas are then added/subtracted in the normal manner, and shift adjusted after the addition/subtraction.

BRIEF DESCRIPTION OF THE DRAWINGS

FIG. 4A-1, 4A-2, 4A-3, 4B-1 and 4B-2 are level diagram of the pre-adder alignment logic for the Operand B mantissa according to the preferred embodiment;

DETAILED DESCRIPTION OF THE PREFERRED EMBODIMENT

Figure 1:
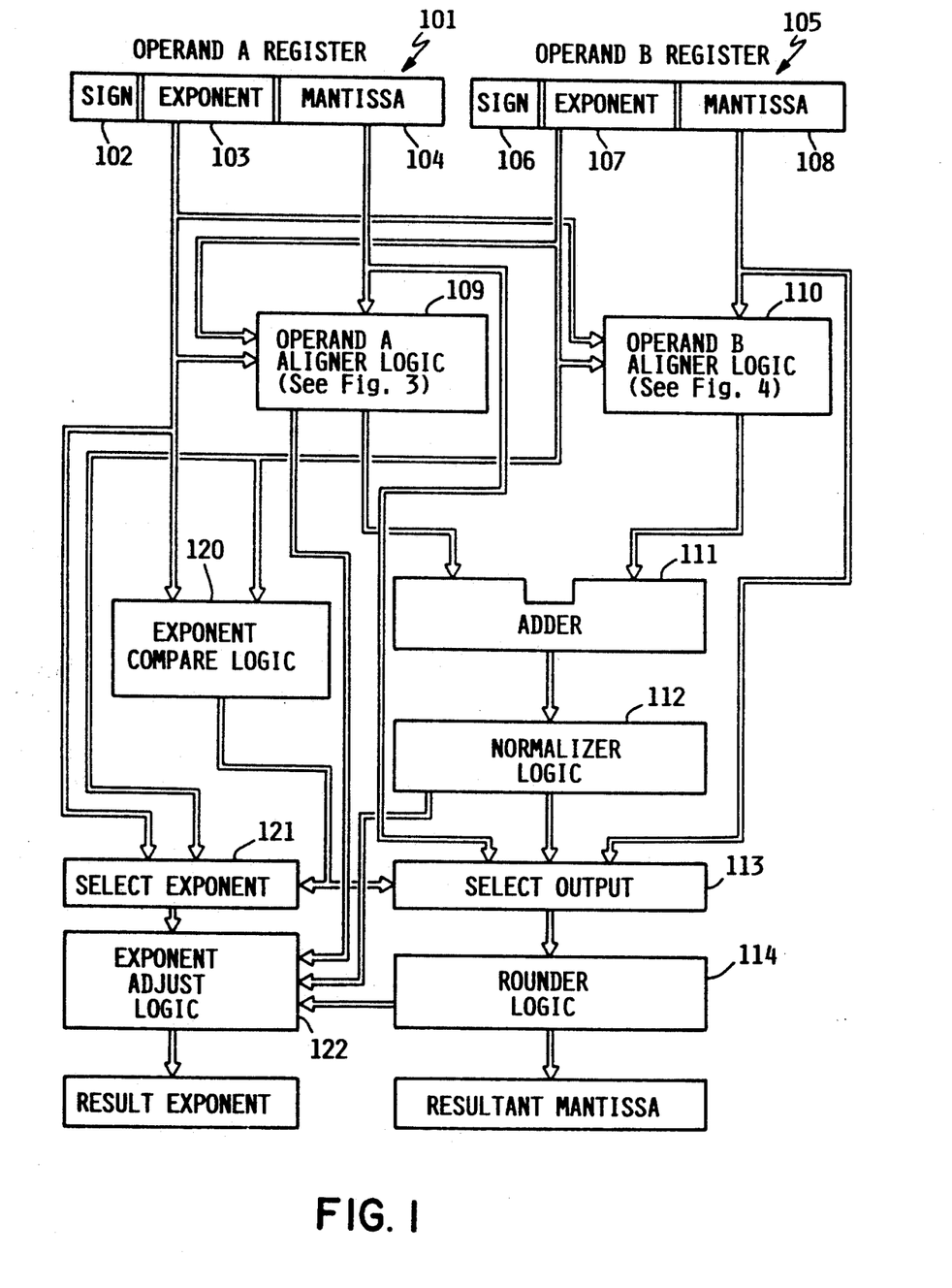
FIG. 1 is a high level diagram of the major hardware components of a floating point addition circuit according to the preferred embodiment of this invention.

The major hardware components of a floating point addition circuit according to preferred embodiment of the present invention are shown in FIG. 1. Operands A and B are stored in respective operand registers 101,105, each register comprising a sign bit 102,106, 11-bit exponent 103,107, and 52-bit mantissa 104,108. In this embodiment, the operands are represented in accordance with ANSI/ IEEE Standard 754-1985, double format for 64-bit numbers, which standard is and herein incorporated by reference. Operand A mantissa register 104 supplies the unadjusted Operand A mantissa to Operand A pre-adder alignment logic 109, and to select output logic 113. Operand B mantissa register 108 supplies the unadjusted Operand B mantissa to Operand B pre-adder alignment logic 110, and to select output logic 113. Operand A and B exponent registers 103,107 respectively supply the unadjusted Operand A and Operand B exponents to alignment logic 109,110, exponent compare logic 120, and select exponent logic 121. Operand A pre-adder alignment logic decodes the two lower bits of the operand exponents to shift Operand A up to 3 bits in either direction. Operand B pre-adder alignment logic decodes the upper nine bits of the operand exponents to shift Operand B up to 76 bits in either direction. The shifted mantissas produced by alignment logic 109,110 are input to adder 111, which adds the two mantissas. The result of the addition is input to normalizer logic 112, which normalizes the result of the addition by shifting the result to remove all leading zeroes, and producing a signal to adjust the exponent by the amount of the shift.

In accordance with the ANSI/IEEE standard, a mantissa contains 53 logical bits. However, because the highest order bit is always '1' (i.e., the exponent value is adjusted so that the highest order '1' becomes the highest order bit), it is only necessary to store 52 bits in system memory. When a mantissa becomes an input to an arithmetic logic unit, it is necessary to reconstruct the assumed high order '1' bit to assure correct arithmetic results. The assumed high-order bit position is designated "Bit 0" of the mantissa; bit positions count up from 0 as their significance declines. The least significant mantissa bit is designated "Bit 52".

If either operand exponent exceeds the other by 53 or more, then the operand with the larger exponent dominates the result, i.e., the result of an addition or subtraction is the same as the operand with the larger exponent, except for possible rounding. Exponent compare logic 120 performs a subtraction of the two operand exponents and outputs three control signals depending on the result, corresponding to the cases where Exponent A exceeds Exponent B by 53 or more, Exponent B exceeds Exponent A by 53 or more, and the difference between the two exponents is less than 53. These three control signals are input to select output logic 113 to select original Mantissa A, original Mantissa B, or the normalized results of the addition, respectively. The selected resultant mantissa is input to rounder logic 114, which rounds at the lowest remaining significant bit. This then becomes the resultant mantissa 115.

Exponent select logic 121 and exponent adjust logic 122 produce the resultant exponent. Exponent select logic 121 takes control signals from exponent compare logic 120 to select one of the two exponents. In the preferred embodiment, Exponent B is selected only if it exceeds Exponent A by 53 or more; in all other cases, Exponent A is selected. Operand A aligner Logic 109 produces a control signal indicating the amount of pre-adder shift for the Operand A mantissa. Normalizer logic 112 produces a control signal indicating the amount of post-addition shift from an assumed binary point (radix point). Rounder logic 114 may also produce a control signal indicating an increment of the exponent by one where the rounding of the least significant digit causes a carry to propagate through all the digits to the most significant. These control signals from aligner logic 109, normalizer logic 112, and rounder logic 114 determine the amount of adjustment of the exponent in exponent adjust logic 122.

Additional logic (not shown) determines the resultant sign bit from the operand sign bits 102,106, the operation being performed (addition or subtraction) and the existence of a carry from adder 111, as is known in the art.

In the preferred embodiment, additional intermediate result registers are used to hold results of various stages of computation. Such intermediate registers permit another set of operands to be loaded into operand registers 101,105 before the first set of operands propagates all the way through the logic, so that the CPU cycle time is not slowed by the time it takes to perform the complete addition. Such a mechanism is known as a pipeline. In the preferred embodiment, two sets of intermediate registers are used, dividing the logic shown in FIG. 1 into a 3-stage pipeline. One of these sets of intermediate registers is located immediately after adder 111 and before normalizer logic 112. The other set is located in rounder logic 114. However, it would be possible to practice the present invention with a different number of intermediate result registers, or without any intermediate result registers. The intermediate result registers have been omitted from FIG. 1 for clarity in representing the logic flow.

Adder 111 may comprise any of various conventional binary addition circuits. Adder may perform either addition or effective subtraction (an effective subtraction occurs where numbers having different sign are added, or numbers having the same sign are subtracted). Effective subtraction is accomplished by inverting the bits of one of the operands before the addition operation, and either inverting the bits of the result or adding 1, based on the carry out after the operation. A control signal (not shown) generated from the sign bits and type of operation (addition or subtraction) determines whether effective addition or effective subtraction is to be performed by adder 111. Unless otherwise clear from the context, as used herein "addition" shall refer generically to either addition or subtraction performed by the adder.

Although a certain amount of logic circuitry is required to determine the resultant sign and resultant exponent, the critical path (i.e., the most time consuming path, on which other processes must wait) for floating point addition typically involves the computation of the resultant mantissa. In the preferred embodiment, this critical path runs from the operand registers 101,105 through operand aligner logic 109,110, adder 111, normalizer 112, select 113, and rounder 114, and exponent adjust logic 122.

Figure 2:
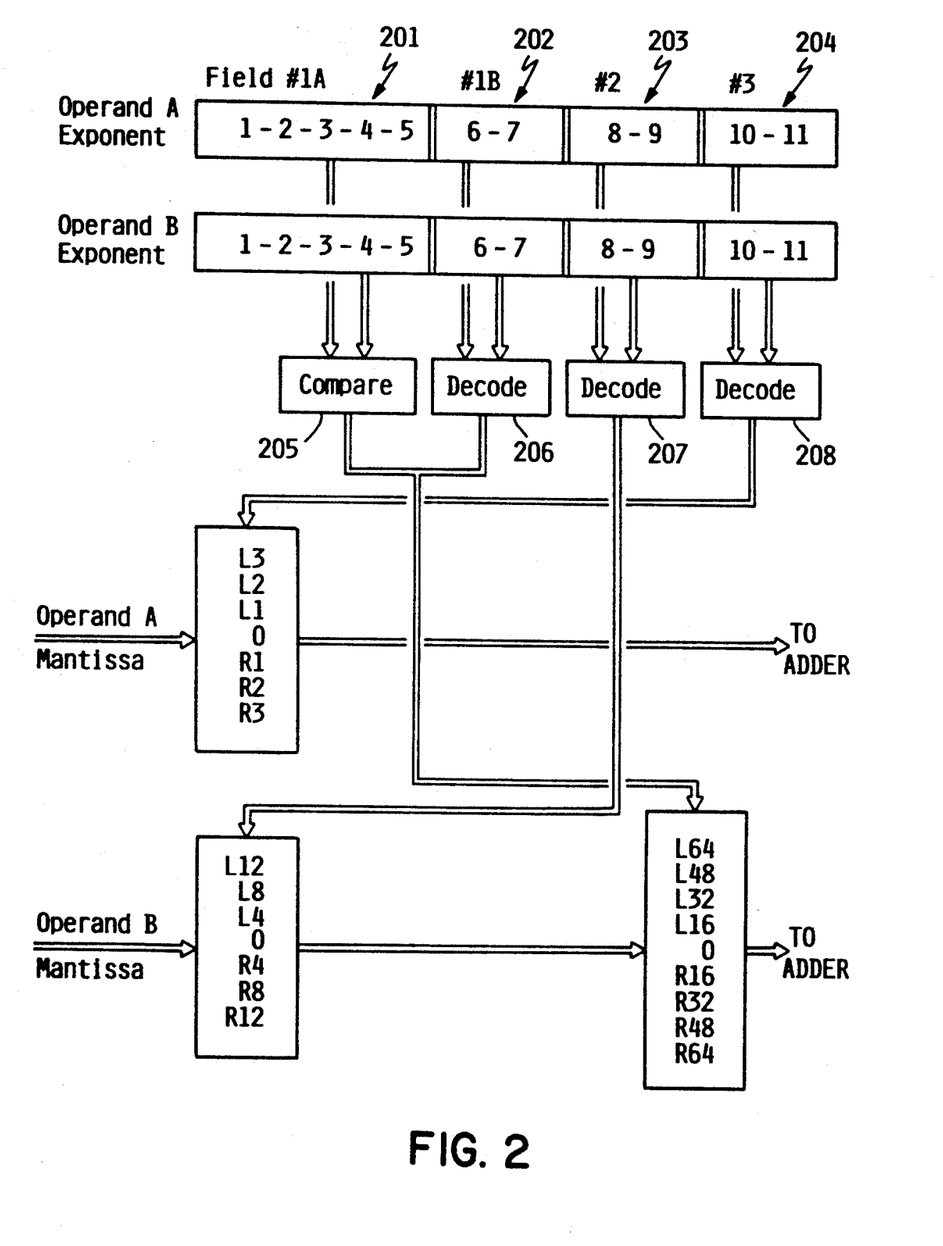
FIG. 2 is a high level diagram of the pre-adder alignment logic for operand mantissas according to the preferred embodiment.

FIG. 2 is a high level diagram of the preadder alignment logic circuits 109,110 according to the preferred embodiment. In this embodiment, the operand exponents are each divided into four fields, which are decoded to provide direct relative shift of the mantissas. In accordance with the ANSI/IEEE floating point standard, each exponent contains 11 bits, which are designated 1 to 11, 1 being the highest order bit, and 11 being the lowest. Field #3 204 consists of the two lowest order bits (10 and 11), field #2 203 consists of bits 8 and 9, field #1B 202 consists of bits 6 and 7, and field #1A 201 consists of the highest 5 order bits (1 to 5). Shift logic circuit 208 decodes the bits in field #3 of the two operands to produce a shift signal corresponding to the difference between field #3 of the respective operands, which is then used to shift the Operand A mantissa, right or left, 0, 1, 2 or 3 bits. The shift logic circuit 207 for field #2 simultaneously decodes the bits in field #2 of the two operands to produce a shift signal, which is used to shift the Operand B mantissa, right or left, 0, 4, 8 or 12 bits. The shift logic circuit for field #1, comprising field #1A 205 and #1B 206, together with bit 8 (which may also be viewed as an additional field #1C) produces a shift signal to shift the B Operand a second time, after it is shifted by the signal produced from field #2. Shift logic 206 decodes the bits in field #1B of the two operands to produce an interim shift signal. The shift logic circuit 205 for field #1A performs a limited decode in the form of a direct compare of the bits in field #1 of the two operands to determine whether they are equal. The result of this direct compare is then combined with the interim shift signal and with bit 8 to produce a signal to shift the Operand B mantissa, right or left, 0, 16, 32, 48 or 64 bits; this shift is performed after the shift from field #2. Because the mantissa is only 53 bits wide, it is not necessary to shift for the additional higher order bits of field #1, because the operand having the larger exponent will dominate the result. In the case of an exponent difference of 53 or more, exponent compare logic 120 will override the results of the addition with the original mantissa of the operand having the larger exponent. Therefore, aligner logic circuits 109,110 proceed on the assumption that the exponent difference is less than 53, and the results thus produced are later overridden if the assumption is erroneous.

Figure 3A:
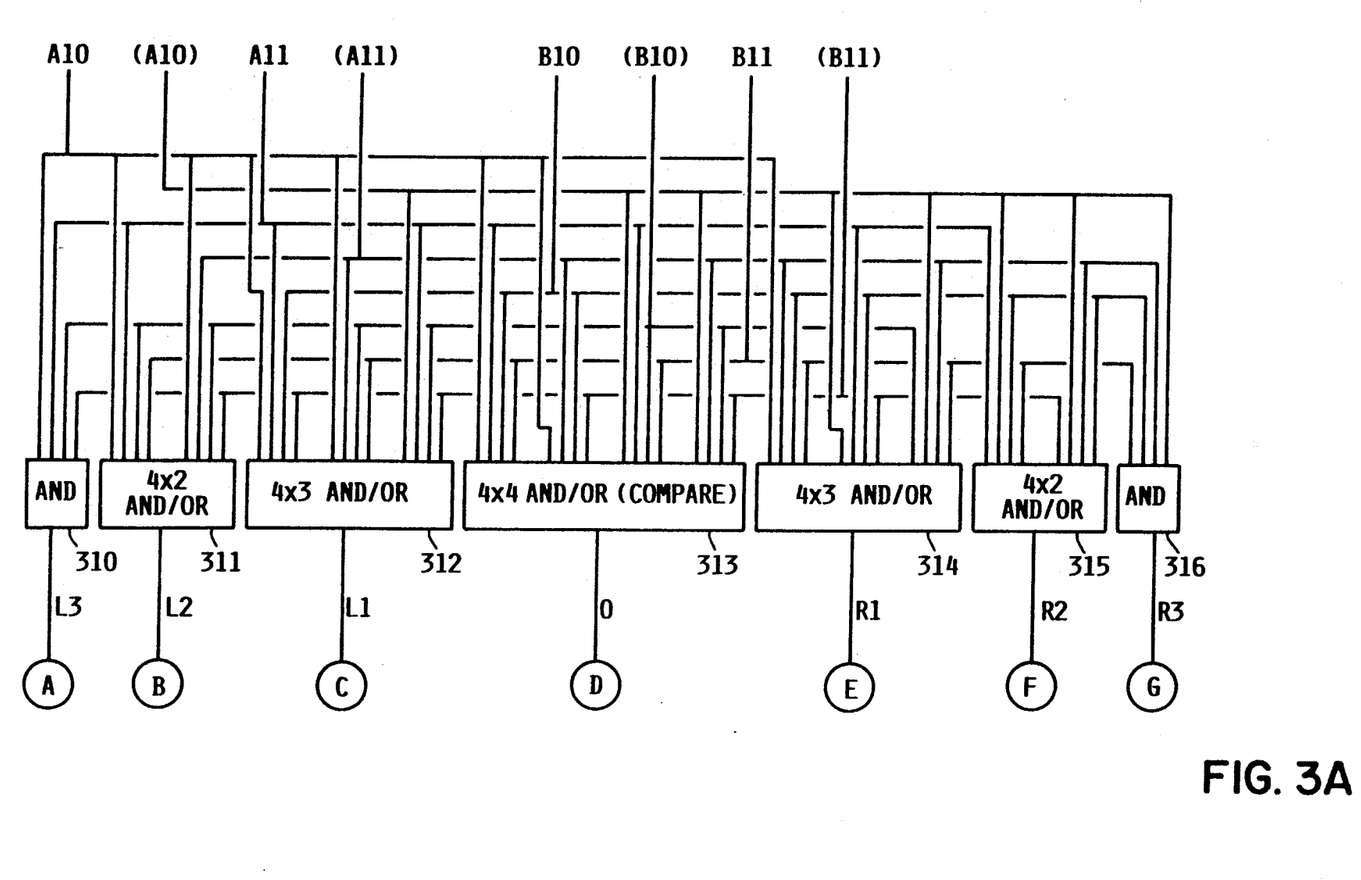
FIGS. 3A-3C are a gate-level diagram of the pre-adder alignment logic for the Operand A mantissa according to the preferred embodiment.
Figure 3B:
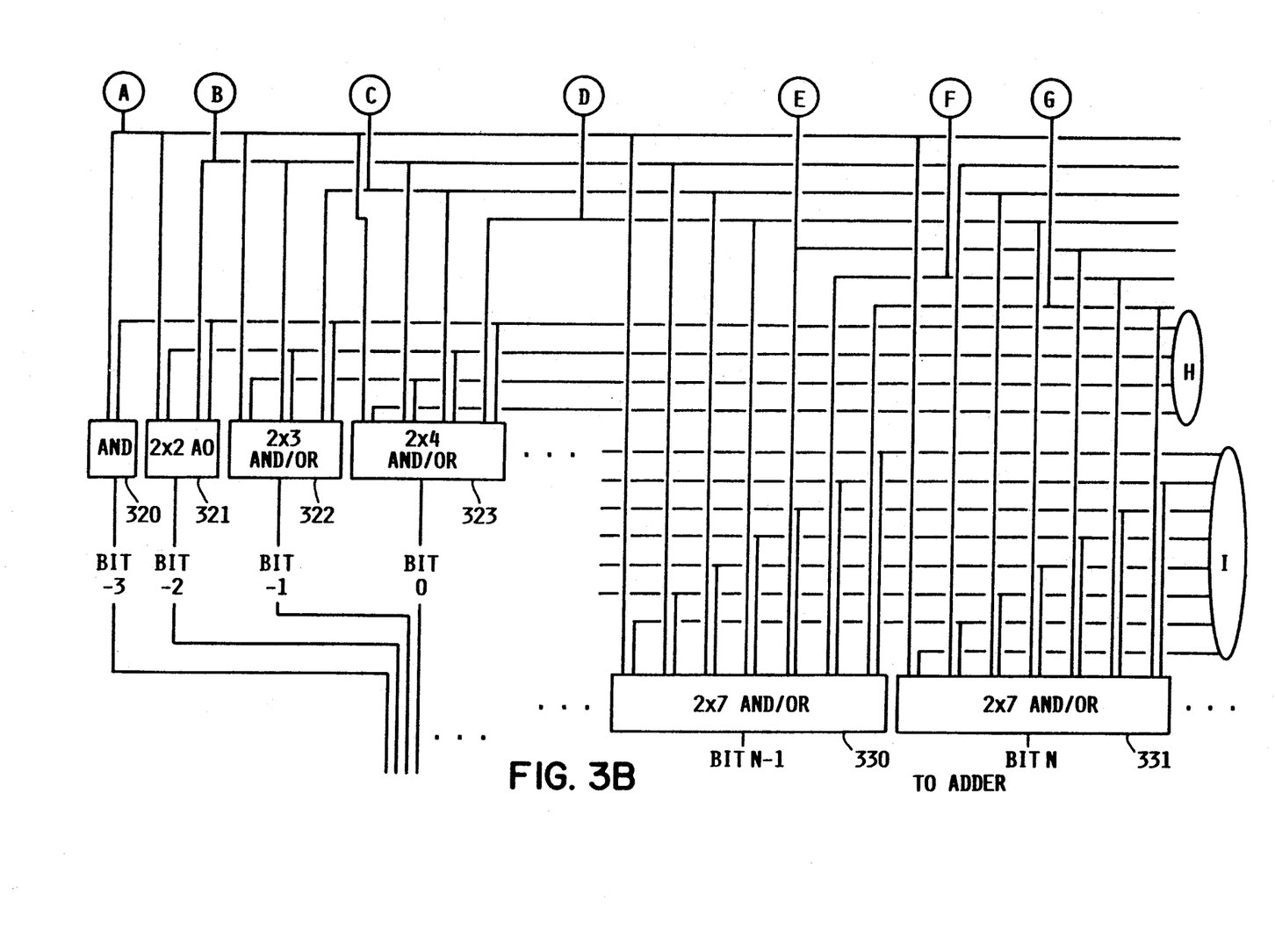
Figure 3C:
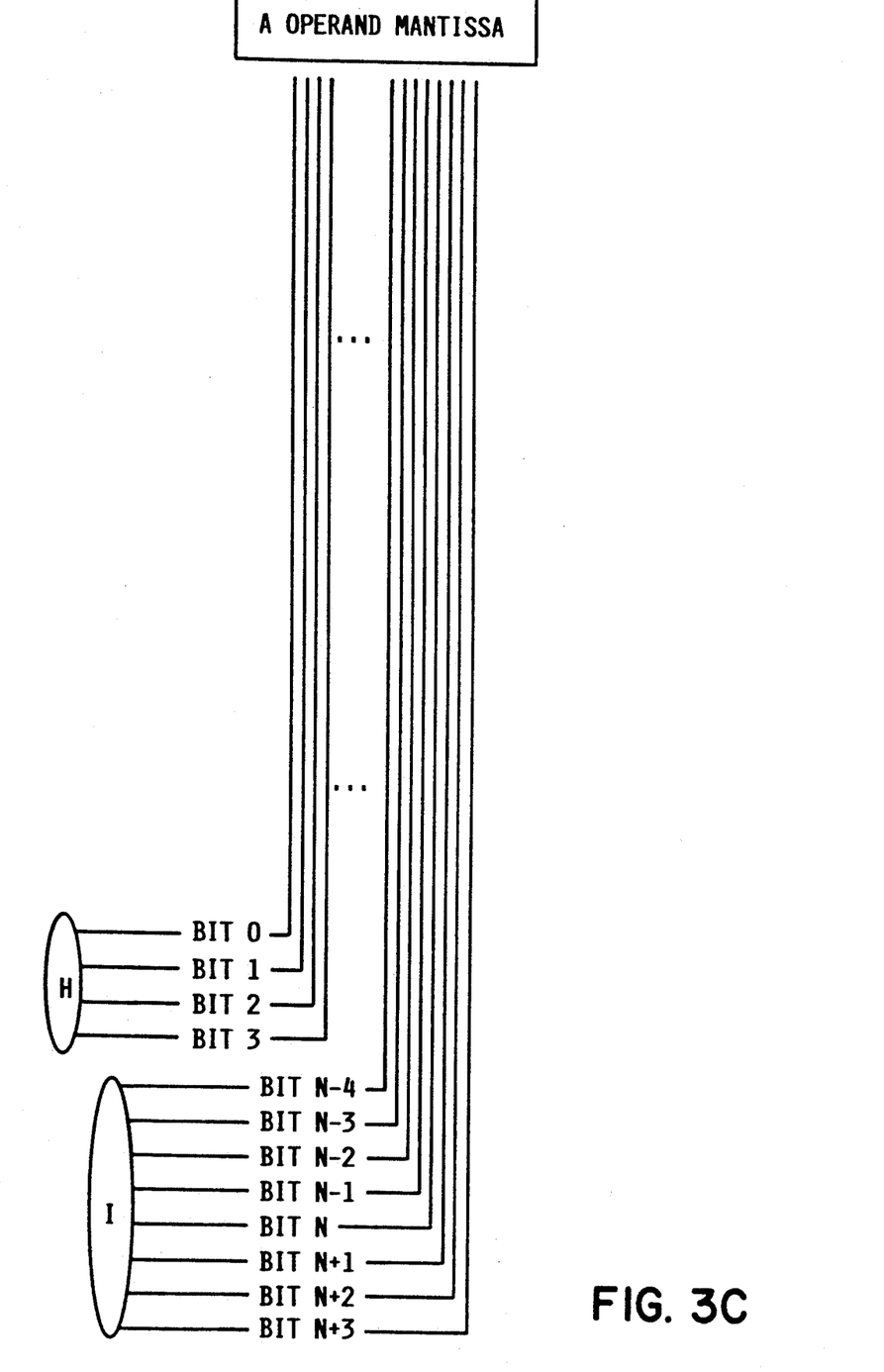
Figure 5:
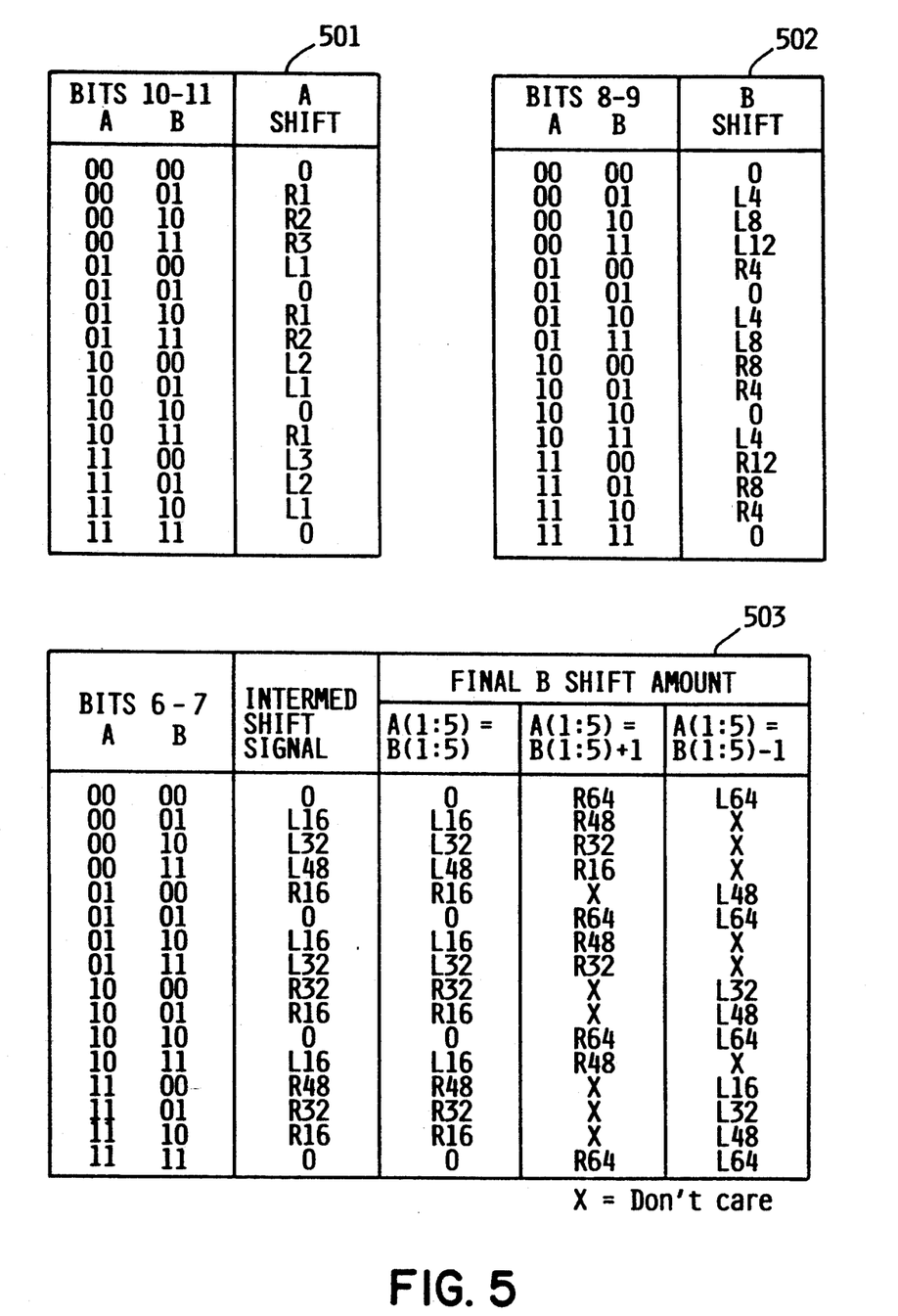
FIG. 5 is a table showing the magnitude and direction of mantissa shift for various combinations of exponent bits according to the preferred embodiment.

FIG. 3 is a gate-level diagram of the preadder alignment logic 109 for the Operand A mantissa according to the preferred embodiment. The logic of FIG. 3 implements the shift conversion shown in table 501 in FIG. 5. The first column of table 501 indicates the values of various bit combinations for the two lowest order bits (bits 10 and 11) of the A and B operand exponents. The second column indicates the resultant shift. In FIG. 5, the letters "R" and "L" designate "Right" and "Left", respectively, while the numbers indicate the magnitude of the shift. For example, if bits 10,11 of Exponent A are '00' and bits 10,11 of Exponent B are '00', the bits are equal and no shift is performed. On the other hand, if the A value is '01' and the B value is '11', the lowest two digits of the B exponent exceed those of the A exponent by 2, indicating that the A mantissa should be shifted to the right by 2 ("R2" in the table).

Figure 4A:
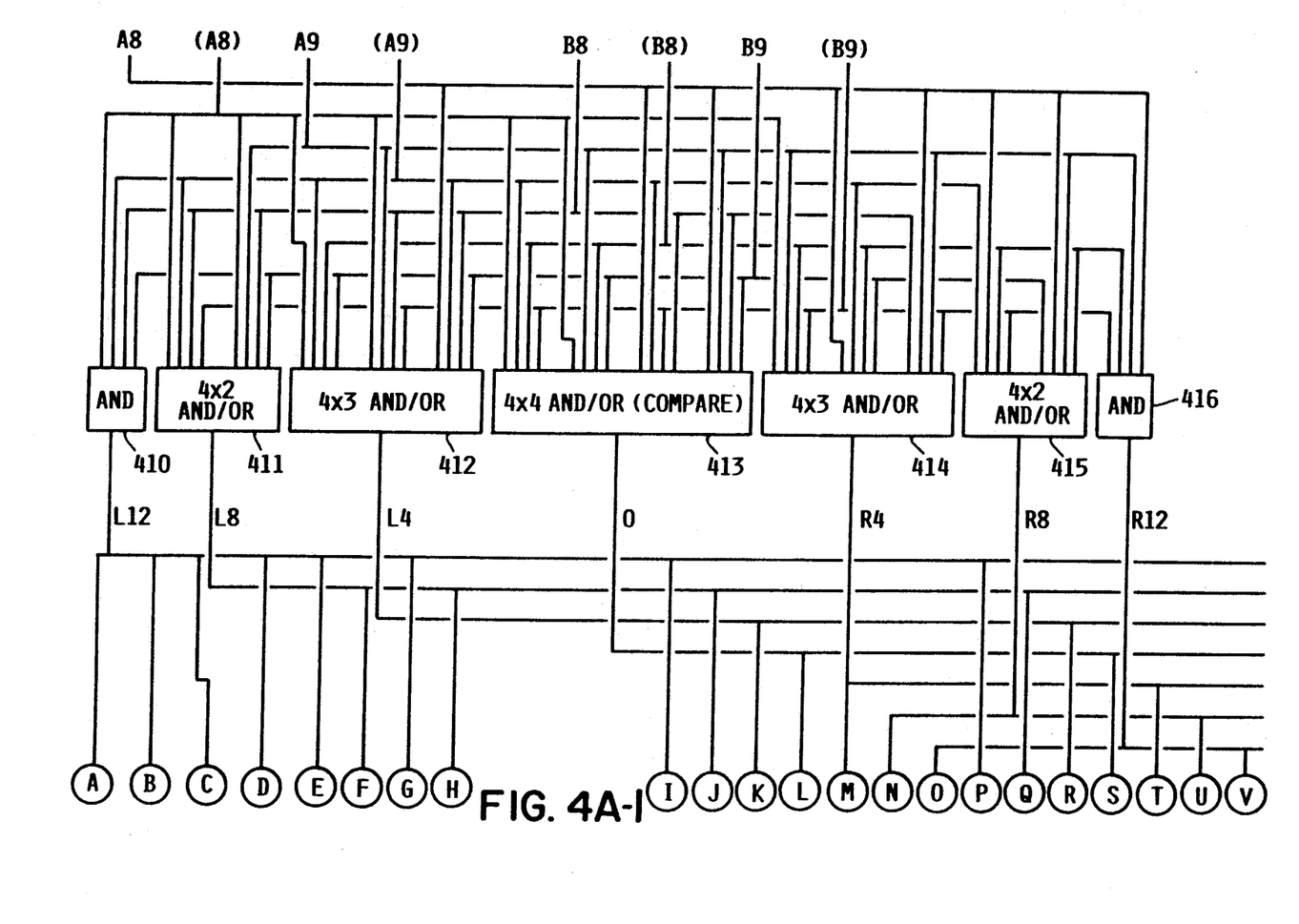
Figure 4A:
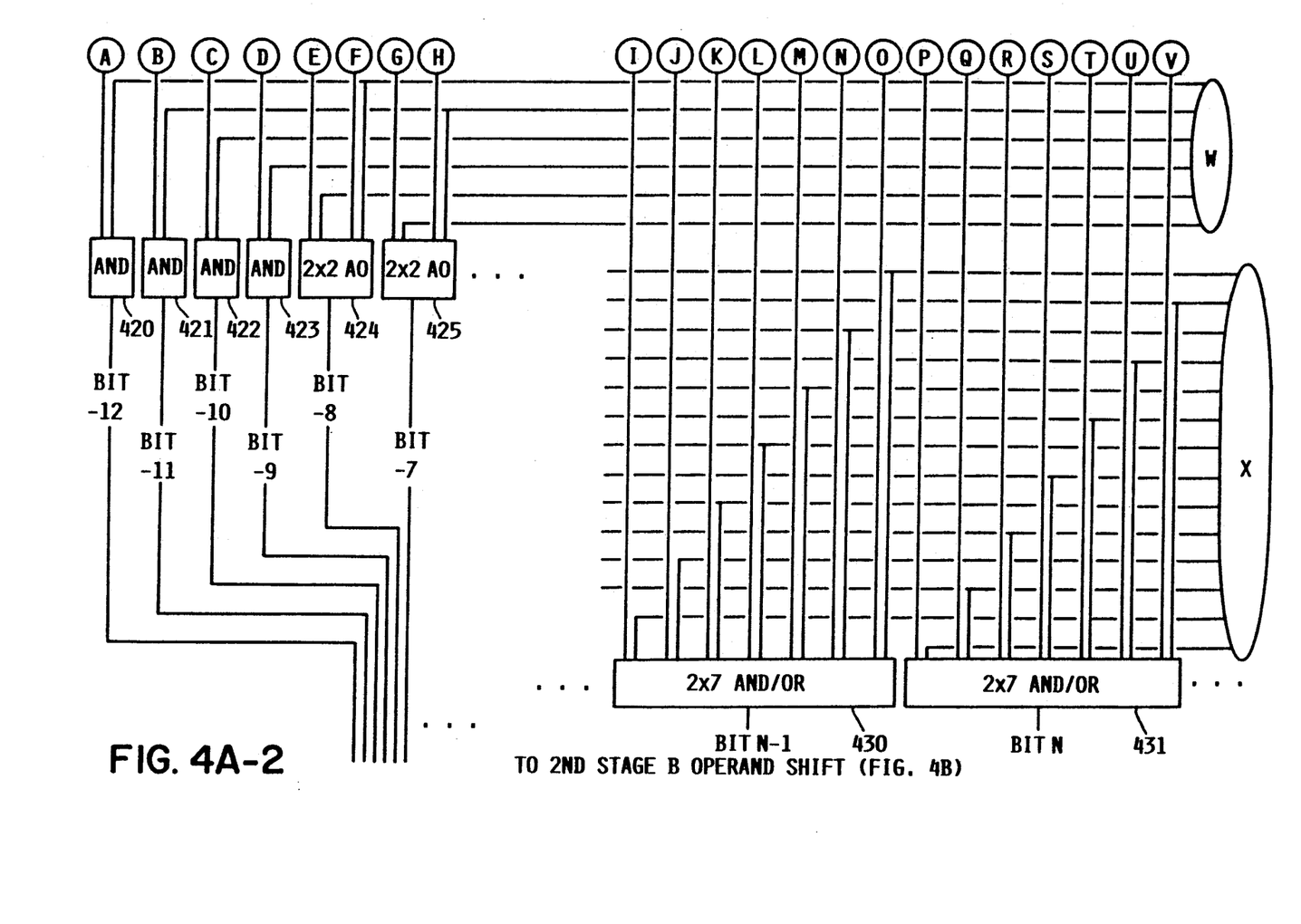
Figure 4A:
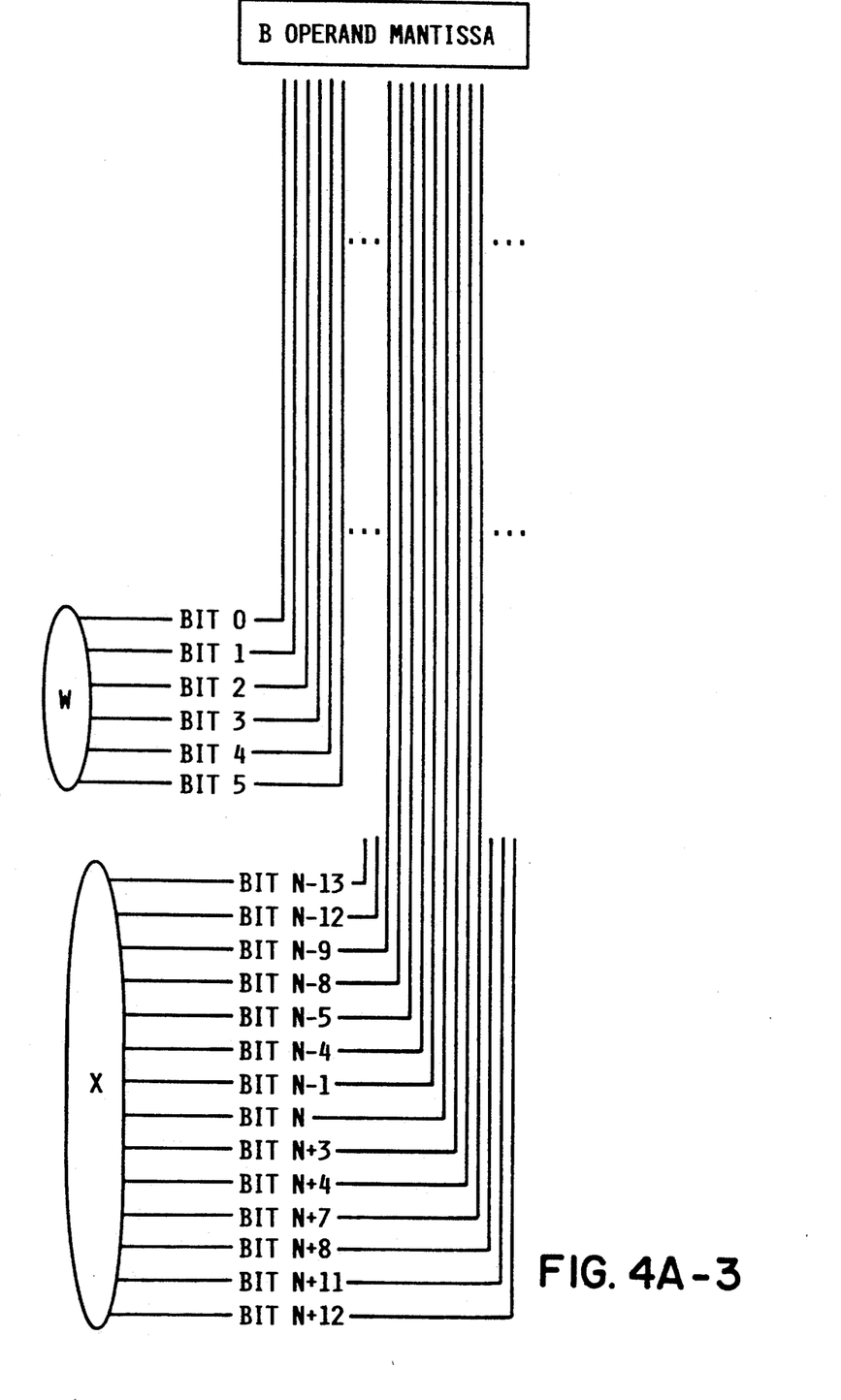

In the gate level diagrams of FIGS. 3, 4A and 4B, boxes having labels of the form "N×M AND/OR" represent logic performing the function of M AND gates, each having N inputs, whose output signals are input to a single OR gate having M inputs, the output of which is the output of the box. In the preferred embodiment, a single gate circuit implements the N×M AND/OR function. However, it should be understood that alternative gate logic could be used.

Referring to FIG. 3, 4×4 AND/OR gate 313 accepts signals <A10> (complement of A exponent, bit 10), <A11>, <B10> and <B11> at one of its AND inputs. This set of signals corresponds to the situation in which the lower two bits of the A and B exponents are both '00'. According to table 501, this combination should produce no shift of the A Operand mantissa. Because all four signals for the AND are present, the AND produces a logical '1' signal, which is propagated through the OR to produce a '1' output from gate 313. Furthermore, since <A10>, <A11>, <B10> and <B11> are all '1', A10, A11, B10, and B11 are '0', and the outputs of the remaining gates at the level of gate 313 (gates 310-2,314-6) will all be zero. The output of gate 313 is connected to one of the two-input ANDs of gate 331, the other input being bit N of the A Operand mantissa. Since all other shift signals are '0', gate 331 will output the value of bit N of the A Operand mantissa. If, on the other hand, the A exponent is '01' and the B exponent is '11', signals <A10>, A11, B10 and B11 will be logical '1', causing gate 315 to output a logical '1' while the remaining shift control gates produce '0'. This output will cause bit N-2 of Operand A mantissa to be output from gate 331, and all other output gates to produce a corresponding shift of the respective bits of the Operand A mantissa, resulting in a 2-bit right shift of the mantissa.

It should be understood that additional gates of the form of gates 320-3,330-1 are present to produce the required output, one such gate for each possible bit position of the mantissa. A total of 59 gates is required to cover the 53-bit wide mantissa and a potential shift of 3 bit positions in either direction. Since there are seven possible shift signals (L3,L2,L1,O,R1,R2,R3), most of the output gates from aligner logic 109 are 2×7 AND/OR gates 330-1 in which there is one AND for each shift signal. However, gates at either extreme end of the bit range are smaller than 2×7, because it is not possible to produce an output from these gates for all possible shifts. This is shown in FIG. 3 with gates 320-3. For example, it is possible to produce an output for bit -1 (from gate 322) only if there is a shift of L3, L2 or L1.

FIGS. 4A and 4B are a gate-level diagram of the pre-adder alignment logic 110 for the Operand B mantissa according to the preferred embodiment. The logic of FIG. 4A constitutes the first stage of the Operand B alignment logic, and implements the shift conversion shown in table 502 in FIG. 5. The logic of FIG. 4B constitutes the second stage of the Operand B alignment logic, and implements the shift conversion shown in table 503 in FIG. 5 on the resultant shifted mantissa from the first stage. As can be seen from table 502 and FIG. 4A, the first stage of the Operand B alignment logic is very similar to the Operand A alignment logic. Gates 410-6 decode bits 8 and 9 of the A and B exponents, and produce a shift signal corresponding to a shift of 12, 8, 4 or 0 bits, right or left, for the B mantissa. Since a difference of 1 in bits 8 and 9 of the exponents corresponds to a difference of 4 in the entire exponents, the magnitude of B shift is four times that for the A shift accomplished by Operand A alignment logic 109. Gates 420-5, 430-1 then use the shift signal as a control to shift the bits of the B Operand mantissa the indicated amount.

Figure 4B:
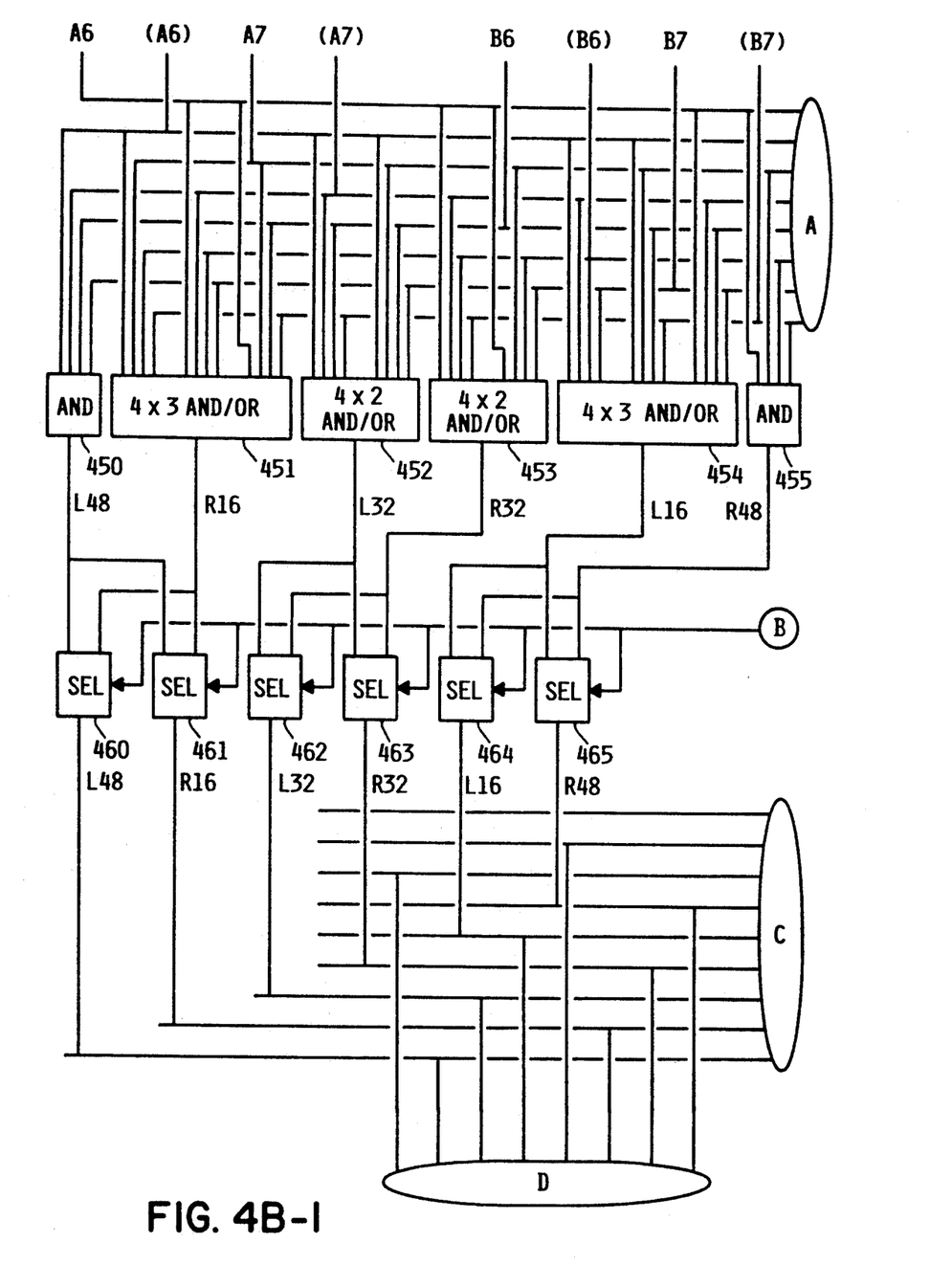
Figure 4B:
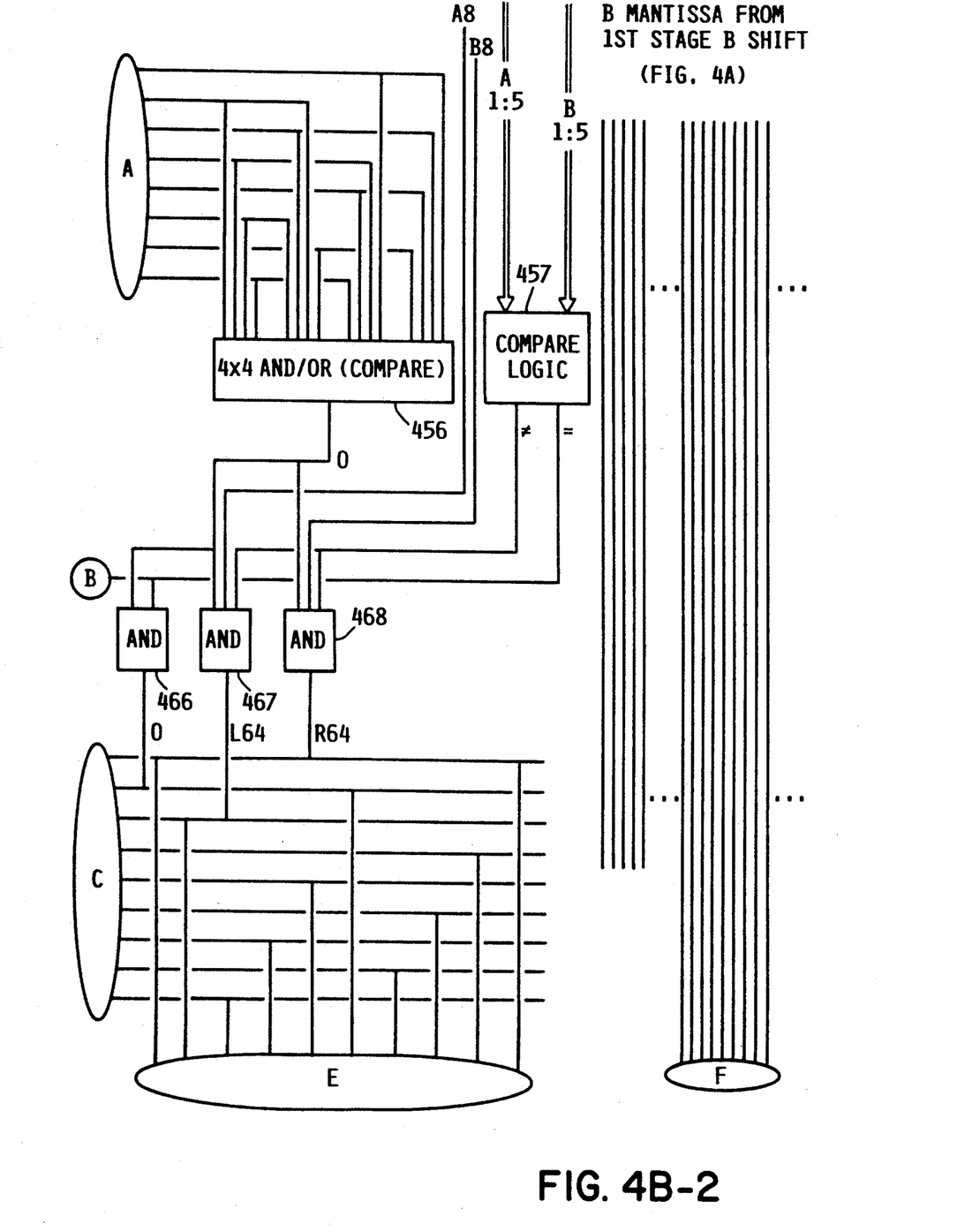
Figure 4B:
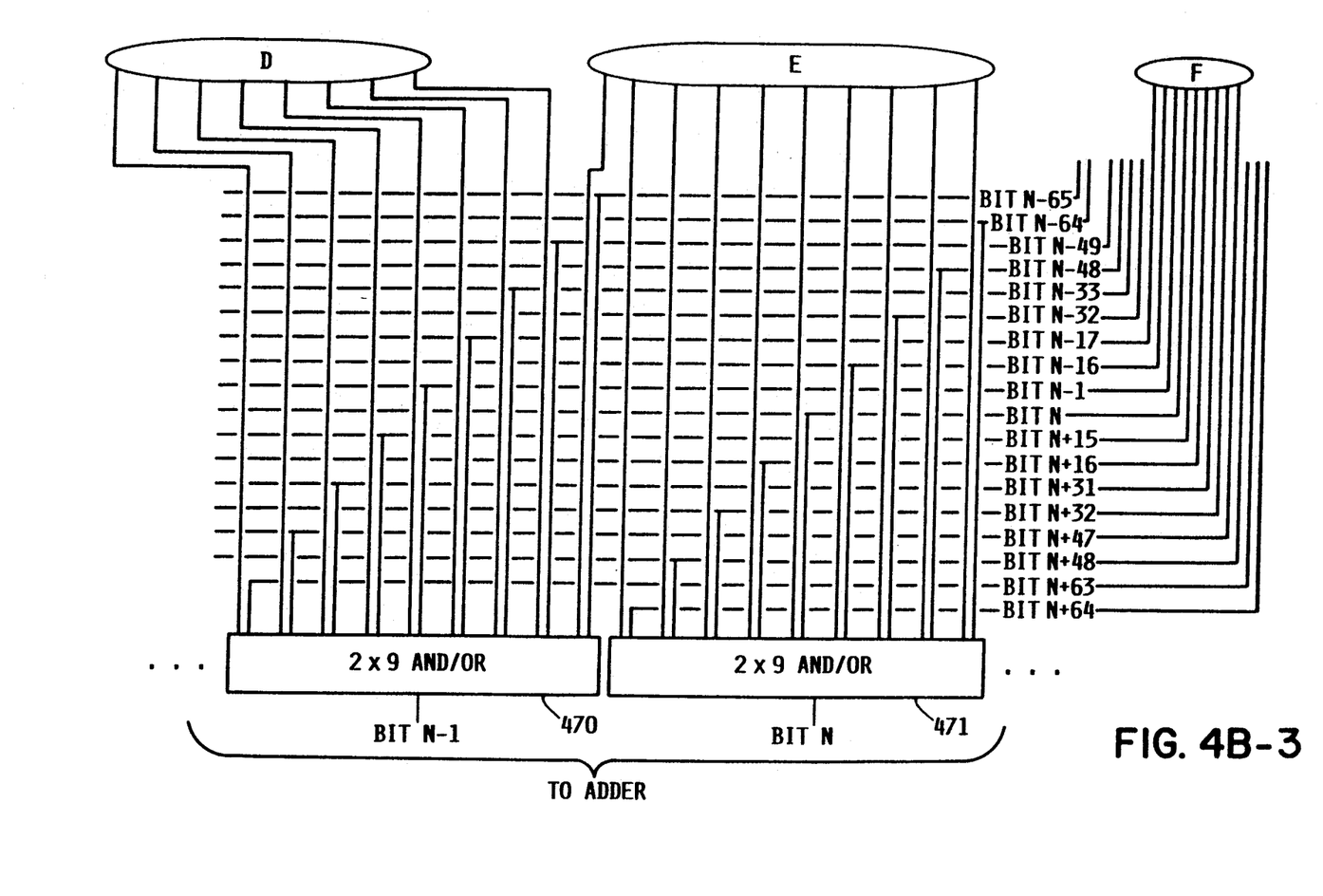

The second stage of the Operand B shift shown in FIG. 4B essentially decodes the highest 7 bits of the exponents. Bits 6 and 7 are input to a set of 4×N AND-/OR gates 450-6 to produce an intermediate shift signal. This logic is similar to that used for decoding bits 10 and 11 in the Operand A alignment logic 109, and for decoding bits 8 and 9 in the first stage of the Operand B alignment logic 110. The intermediate shift signal represents the correct shift amount, assuming that bits 1 through 5 of the exponents are equal. Compare logic 457 performs a direct compare of bits 1-5 to produce two signals, corresponding to the cases where the bits are all equal or not all equal. If bits 1-5 are equal, the equal signal from compare logic 457 causes selector gates 460-5 or AND gate 466 to produce the corresponding intermediate shift signal.

If bits 1-5 are not identical, the logic assumes that either the highest order 5 bits of the A exponent exceed the corresponding bits of the B exponent by 1, or those of the B exponent exceed those of the A exponent by 1. In this case, a right or left shift of 64 is required in addition to the shift indicated by the intermediate shift signal. However, if the intermediate shift signal indicates a non-zero shift and the additional shift of 64 is in the same direction, a shift of at least 80 (64 plus 16) is indicated. Such a shift would mean that one of the exponents exceeds the other by more than 53, and therefore the result of the addition of mantissas is meaningless. Select output logic 113 will eventually override the addition with one of the original mantissas. As a result, it is not necessary, in the case of a non-zero intermediate shift, to determine the direction of the additional shift of 64. The logic assumes the direction is opposite to that of the intermediate shift. The selector gates 460-465 select a signal which is in the opposite direction and differs from the original signal by 64. This is summarized in table 503. For example, if the A exponent bits 6-7 are '00' and the B exponent bits 6-7 are '01', an intermediate shift of L16 is indicated as the output of gate 454. If A(1:5)=B(1:5), L16 is the final resultant shift, and will by output on selector 464. If A(1:5)≠B(1:5), we assume a shift in the opposite direction (caused by A(1:5)=B(1:5).1) of 64, yielding a final resultant shift of R48, which will be output on selector 465 The case where A(1:5)=B(1:5)−1 is a don't care situation (indicated in table 503 by "X"), because the results of the addition will be overridden by select output logic 113.

If bits 1-5 are unequal and the intermediate shift signal indicates a shift of 0 (i.e., bits 6-7 are equal), then it is necessary to determine the direction of the shift by 64 indicated by bits 1-5 because either direction could be meaningful. For example, if stage 2 indicates a left shift of 64, but stage 1 indicates a right shift of 12, the cumulative shift is 52, which is within the range of significance. However, the shift is meaningful only if the shift in stage 1 is of magnitude 12, and direction opposite to that in stage 2. If, for example, the stage 2 shift is L64 and the stage 1 shift is R8, the cumulative shift of the B Operand mantissa is L56. In this case, even if the A Operand mantissa is shifted L3, the cumulative relative shift if the B mantissa vis-a-vis the A mantissa is still 53. Since there are only 53 significant bits, a shift of 53 will cause Operand B to dominate Operand A, and select output logic 113 will ignore the results of the addition. The logic therefore operates on the assumption that the stage 1 shift was of magnitude 12, in a direction opposite to that of the required stage 2 shift. The direction of the stage 2 shift of 64 can then be ascertained if the stage 1 shift is known. Since the stage 1 shift was of magnitude 12 (assumed), bit 8 of the A Operand exponent will be '1' for a right shift, and bit 8 of the B Operand exponent will be '1' for a left shift. These signals are therefore used as inputs to AND gates 467,468 to produce a shift signal in the correct direction.

While compare logic 457 is described herein as a logical compare of bits 1-5, in actual implementation it is not necessary to compare all five bits because differences in the higher order bits will result in exponent differences greater than 53, causing the results of the addition to be discarded by select output logic 113. In the circuit of the preferred embodiment, it is only necessary to compare bit 5 of the respective exponents. If the 5th bits are equal, we may assume bits 1-4 are equal because if there is an inequality in bits 1-4, the exponent difference is at least 65 (the 4th bit representing 128, and bits 6-11 representing at most a difference of 63).

Only one of the gates 460-8 will produce a shift signal of '1', indicating a shift of the corresponding amount. The shift signals from gates 460-8 control the data signals to be passed through 2×9 AND/OR gates 470-1. For example, if AND gate 466 produces a '1', the signal on the bit N-1 line is passed through gate 470, and the signal on the bit N line is passed through gate 471, resulting in no shift. If, on the other hand, SEL gate 463 produce a '1', the signal on the bit N-33 line is passed through gate 470, and the signal on the bit N-32 line is passed through gate 471, resulting in a right shift of 32. It should be understood that additional gates of the form of 470-1 exist, one for each bit line of the B Operand mantissa going into adder 111. Some of these gates will not need all nine control signals produced by gates 460-8.

Aligner logic circuits 109,110 of the preferred embodiment produces the correct relative alignment of the operand mantissas with only three gate delays. Operand A aligner logic 109 requires two gate delays, gate set 310-6 constituting the first gate delay, and gate set 320-3, 330-1 constituting the second set. Operand B aligner logic 110 requires three gate delays, with occur concurrently with the gate delays of Operand A aligner logic 109. In the first stage, gate set 410-416 causes a first delay, and gate set 420-5,430-1 causes a second delay. In the second stage, gate set 450-457 causes a first delay concurrently with the delay from gates 410-416, and with the delay from gates 420-5,430-1. Gate set 470-1 then causes a third gate delay. Thus, while five sets of gates are present in Operand B aligner logic 110, two sets operate concurrently with two other sets, so that the total gate delay caused by the logic is only three gates.

Figure 6:
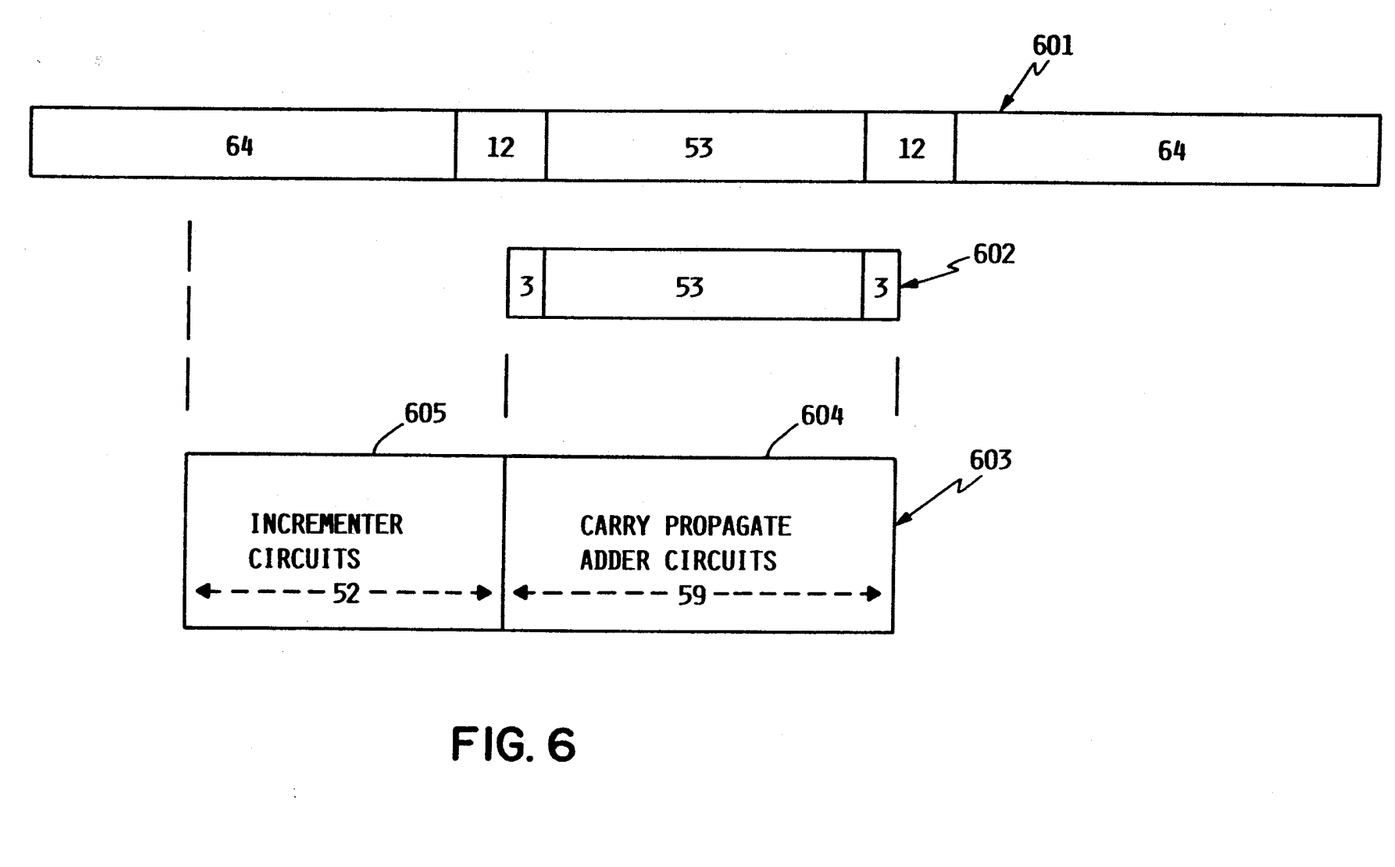
FIG. 6 depicts the possible shift ranges of mantissas and consequent width of adder circuits required according to the preferred embodiment.

In order to support shifting of both operands in either direction, adder 111 must be widened to accommodate the additional range of the operands. This is depicted in FIG. 6. Operand A can shift up to 3 bit positions in either direction, making a total width of 59 bit positions 602 required to cover Operand A. Operand B's range 601 theoretically spans 76 bit positions to the right or left of the original 53 bit positions of the mantissa, accounting for a maximum shift of 12 in the first stage of the Operand B alignment logic and 64 in the second. However, it is not necessary for the adder to accommodate bits to the right of the right-most (least significant) bit of Operand A, because these lower order bit positions are insignificant. Nor is it necessary to accommodate an Operand B shift of more than 52 to the left, because select output logic 113 will ignore the result. Therefore the adder must accommodate 52 additional bit positions to the left of the 59 bit position range 602 of Operand A, for a total of 111 bit positions 603. A full carry propagate adder circuit 604 is recurred for the 59 bit position range 602 of Operand A. Because only one operand can have significant bits to the left of this 59 bit position range, an incrementer circuit 605 is sufficient for these 52 bit positions. In the preferred embodiment, adder 111 comprises a 59-bit full adder portion and a 52-bit incrementer portion, although it would be possible to use a 111-bit full adder.

In the gate-level logic diagrams of FIGS. 3, 4A and 4B, certain control signals have been shown with unrealistically large fan-out. The logic has been represented in this manner for clarity. Various techniques exist in the art for reducing the fan-out to the range supported by a particularly physical device technology. For example, in the preferred embodiment, multiple copies of certain control signal logic exist to generate multiple identical control signals, thus reducing the fan-out for each signal to feasible levels. In the alternative, it would be possible to place additional drivers in the logic to generate the required additional copies of the signals, although this alternative may introduce additional gate delays.

Although the circuit of the preferred embodiment is designed to perform floating point addition on operands represented according to the ANSI/IEEE 64-bit standard, it should be understood that operands represented by different floating point conventions could be added. Such addition may require modification of the logic circuitry to accommodate the requisite number of bit positions of exponent and mantissa.

In the preferred embodiment, the exponent is divided into fields of 2 bits, except for the most significant bits, in which it is only necessary to perform a direct compare of exponents. This allocation is optimized for the ANSI/IEEE 64-bit standard. Different field allocations are possible, and may be preferable when using other floating point formats. For example, it would be possible to divide the exponent into fields of differing sizes. The three least significant bits could be used to produce the A Operand shift, requiring 15 gates producing control signals as opposed to 7 required in the preferred embodiment. Such a design would require additional logic gates, but may reduce the number of gate delays for certain formats of exponent and mantissa. Nor is it necessary that each field of the A Operand be the same size as the corresponding field of the B Operand, to which it is compared. For example, one shift logic circuit could decode bits 9-11 of the A Operand and bits 10-11 of the B Operand to produce a shift signal, while another shift logic circuit decodes bits 7-8 of the A Operand and bits 7-9 of the B Operand. Alternatively, a shift logic circuit could decode bits from only one of the exponents. For example, one shift logic circuit could decode bits 9-11 of the A Operand exponent to produce a shift signal for the A Operand mantissa, while another shift logic circuit decodes bits 9-11 of the B Operand exponent to produce a shift signal for the B Operand mantissa. As a further alternative, it would be possible to divide the A Operand aligner logic 109 into two stages, as is done for the B Operand aligner logic 110, to obtain additional range of shifting for the A Operand.

In the preferred embodiment, both operand mantissas are potentially shifted to achieve a correct relative alignment. In the alternative, it would be possible to divide the exponents into fields as described for operation of shift logic signals, but to shift only one of the operands. Such an approach would have the advantage of not requiring additional width in the adder circuitry to support potential shifting in both directions of both mantissas. For example, carry-propagate adder portion 604 would only have to be 53 bits wide. However, it would generally introduce additional gate delays, because a single mantissa would have to be shifted additional times. For example, if the shift control logic of the preferred embodiment were used to generate shift signals from an 11-bit exponent, the B operand would have to go through 3 possible sequential shifts (instead of 2 in the preferred embodiment).

The circuit of the preferred embodiment can also be used to perform addition of floating point operands having less precision, but otherwise using the same format. For example, numbers represented according to ANSI/IEEE single format (having an 8-bit exponent and 23-bit mantissa) can be added/subtracted by simply padding the 3 most significant bits of exponent and 29 least significant bits of mantissa with zeroes when loading these numbers to operand registers 101,105. Aligner logic 109,110, adder 111, normalizer 112 and select output logic 113 would work exactly the same way. Rounder logic 114 would then round the mantissa to the appropriate number of significant bit positions.

The circuit of the preferred embodiment accepts two operands. However, it should be understood that it would be possible to construct circuits according to the present invention which add three or more operands together Although the circuit of the preferred embodiment has been described as implementing a floating point addition operation, it should be understood that it may be used, in conjunction with other circuitry not shown, to implement compound operations. In particular, it may be used to implement a multiply/add instruction which performs the operation $A \times B + C$. In this case, the Operand A and Operand B exponents would be added to produce a product exponent. The product exponent and Operand C exponent would then be divided into fields and serve as the control logic input for aligner logic 109,110. In this embodiment, some steps of the addition could overlap the multiplication (i.e., the operations are not performed serially).

Although a specific embodiment of the invention has been disclosed along with certain alternatives, it will be recognized by those skilled in the art that additional variations in form and detail may be made within the scope of the following claims.

What is claimed is:

1. An apparatus for performing floating point addition of a first operand, comprising a first operand exponent and a first operand mantissa, with a second operand, comprising a second operand exponent and a second operand mantissa, said apparatus comprising:

first operand mantissa shift determination means for comparing N bits of said first operand exponent with M bits of said second operand exponent, where N and M are predefined non-negative integers at least one of which is greater than zero, to generate a first operand mantissa shift signal, said first operand mantissa shift signal corresponding to the difference between said N bits of said first operand exponent and said M bits of said second operand exponent;

first operand mantissa alignment means, coupled to said first operand mantissa shift determination means, for shifting said first operand mantissa in response to said first operand mantissa shift signal by an amount corresponding to the difference between said N bits of said first operand exponent and said M bits of said second operand exponent, whereby said first operand mantissa alignment means produces a shifted first operand mantissa;

second operand mantissa shift determination means for comparing P bits of said first operand exponent with Q bits of said second operand exponent, where P and Q are predefined non-negative integers at least one of which is greater than zero, to generate a second operand mantissa shift signal, said second operand mantissa shift signal corresponding to the difference between said P bits of said first operand exponent and said Q bits of said second operand exponent;

second operand mantissa alignment means, coupled to said second operand mantissa shift determination means, for shifting said second operand mantissa in response to said second operand mantissa shift signal by an amount corresponding to the difference between said P bits of said first operand exponent and said Q bits of said second operand exponent, whereby said second operand mantissa alignment means produces a shifted second operand mantissa;

means for adding said shifted first mantissa to said shifted second mantissa to produce an unadjusted resultant mantissa; and means for normalizing said resultant mantissa to produce a normalized resultant mantissa.

2. The apparatus for performing floating point addition of claim 1, wherein none of said N bits of said first operand exponent is the same as any of said P bits of said first operand exponents, and wherein none of said M bits of said second operand exponent is the same as any of said Q bits of said second operand exponent.

3. The apparatus for performing floating point addition of claim 1, wherein N, M, P and Q are greater than zero.

4. The apparatus for performing floating point addition of claim 3, wherein N and M are equal, and wherein P and Q are equal.

5. The apparatus for performing floating point addition of claim 4, wherein said N, M, P and Q bits are N, M, P and Q contiguous bits, respectively.

6. An apparatus for performing floating point addition of a first operand, comprising a first operand exponent and a first operand mantissa, with a second operand, comprising a second operand exponent and a second operand mantissa, and apparatus comprising:

means for dividing said first operand exponent into N field, each field comprising one or more bits of said first operand exponent, where N is a predefined positive integer greater than one;

means for dividing said second operand exponent into M fields, each field comprising one or more bits of said second operand exponent, wherein each one of said fields of said second operand exponent corresponds to one of said fields of said first operand exponent;

means for concurrently decoding said fields of said first operand exponent and said operand exponent to produce a plurality of shift signals;

means for shifting said first operand mantissa responsive to a first set of said plurality of shift signals to produce an aligned first mantissa;

means for shifting said second operand mantissa responsive to a second set of said plurality of shift signals to produce an aligned second mantissa;

means for adding said shifted first mantissa to said shifted second mantissa to produce an unadjusted resultant mantissa; and means for normalizing said resultant mantissa to produce a normalized resultant mantissa.

7. The apparatus for performing floating point addition of claim 6, wherein N is equal to M, wherein each of said fields of said first operand exponent corresponds to one of said fields of said second operand exponent, and wherein said means for concurrently decoding said fields comprises means for concurrently decoding each field of said first operand exponent with the corresponding field of said second operand exponent to produce said plurality of shift signals.

8. The apparatus for performing floating point addition of claim 6, wherein each field of said first operand mantissa is the same size and contains the same bit positions as the corresponding field of said second operand mantissa.

9. The apparatus for performing floating point addition of claim 6, wherein said first and second set of shift signals are disjoint.

10. The apparatus for performing floating point addition of claim 6 wherein said means for shifting said first operand mantissa comprises:

first shifting means for shifting said first operand mantissa responsive to a first shift signal produced by said means for concurrently decoding each field;

second shifting means for shifting said first operand mantissa responsive to a second shift signal produced by said means for concurrently decoding each field, wherein said second shifting means shifts said first operand mantissa after said first operand mantissa has been shifted by said first shifting means.

11. The apparatus for performing floating point addition of claim 6, wherein N is greater than two.

* * * * *